United States Patent [19]
Bauchner et al.

[11] Patent Number: 6,029,153
[45] Date of Patent: Feb. 22, 2000

[54] METHOD AND SYSTEM FOR ANALYZING AND HANDLING THE CUSTOMER FILES OF A FINANCIAL INSTITUTION

[75] Inventors: Renee Bauchner; Henry Weinberger, both of New York; Wilbur E. Wright, Elmsford; Al Newman, Huntington, all of N.Y.

[73] Assignee: Citibank, N.A., New York, N.Y.

[21] Appl. No.: 08/927,683

[22] Filed: Sep. 11, 1997

Related U.S. Application Data

[63] Continuation of application No. 08/616,185, Mar. 15, 1996, abandoned.

[51] Int. Cl.$^7$ .............................. G06F 15/20; G06F 15/40; G06F 17/00; G04B 19/22
[52] U.S. Cl. .............................. 705/42; 705/43; 705/14; 395/739; 235/379
[58] Field of Search ........................ 382/100, 7; 395/214, 395/600, 739, 227, 237, 235, 240; 283/58

[56] References Cited

U.S. PATENT DOCUMENTS

| | | | |
|---|---|---|---|
| 5,309,355 | 5/1994 | Lockwood | 364/401 |
| 5,347,653 | 9/1994 | Flynn et al. | 395/600 |
| 5,383,120 | 1/1995 | Zernik | 364/419.08 |
| 5,388,165 | 2/1995 | Deaton et al. | 382/7 |
| 5,455,953 | 10/1995 | Russell | 395/739 |

FOREIGN PATENT DOCUMENTS

| | | | |
|---|---|---|---|
| 0 370 146 A1 | 1/1988 | European Pat. Off. | G06F 15/21 |
| O370146 | 5/1990 | European Pat. Off. | G06F 15/21 |
| 3400123 | 11/1985 | Germany | G06F 15/21 |
| 9423383 | 10/1994 | WIPO | G06F 15/22 |

OTHER PUBLICATIONS

Robert Buday, "Hancock Carries Insurance Against Risky Services Business",Informatin Week, p. 33–35, Aug. 18, 1986.

Robert Buday, "Hancock Signs Off On Systems Project", Information Week, p. 35, Aug. 18, 1986.

Y.Y. Chan, E.G. Saw & T.S. Dillon, "An Expert System for a Portfolio Management Using Both Frames and Production Rules" Proceedings of the 8th. Int'l. Workshop on Expert Systems and their Applications, Avignon, France, May 30, 1988–Jun. 3, 1988, p. 463–481.

Michael P. Sullivan, Database Marketing: Frill of Necessity?, Bankers Monthly, p. 34, Jun. 1992.

B. Mareschal and J.P, Brans, "An Industrial Evaluation System", European Journal of Operational Research, V. 54. Iss. 3, p. 318–324, Oct. 16, 199.

Bo Hedberg, "Le Nuove Technologie e la Rivoluzione nei Servizi delle Banche: il Caso di Stoccolma", in "Innovazioni Technologiche: Nuove Opportunita per gli Anni '90", Pedro Kanof ed., Franco Angeli Editore, Milan, Italy, p. 29–41, Dec. 1991.

International Search Report, Jul. 9, 1997.

Williams, N.; "Marketing by Numbers"; Banking Technology; v6 n6; Jun. 1989.

(List continued on next page.)

*Primary Examiner*—Allen R. MacDonald
*Assistant Examiner*—Pedro R. Kanof
*Attorney, Agent, or Firm*—George T. Marcou; Kilpatrick Stockton LLP

[57] ABSTRACT

A system and method for identifying and communicating the availability of additional products to at least one customer of a financial institution is disclosed. A processor analyses data about the customer and identifies characteristics indicative of financial products compatible with the customer's financial needs. The customer's files are appropriately electronically tagged and representatives of the financial institution are alerted of the marketing opportunity and, in turn, communicate the availability of the product to said customer. The representative may be a teller, branch manager, telemarketer or direct mail supervisor. Reporting of tagging is also provided.

22 Claims, 24 Drawing Sheets

OTHER PUBLICATIONS

Brown, Anitra S.; "Profitable Persuasion: Before Deciding to Cross–sell Products and Services, Banks are Figuring Out When It's Worth the effort"; Direct; v6 n4; p S8(3); Apr. 1994; see page 2, lines 23–44 and pp. 33–45.

Conway, AR; "Profiting from Banking's Data Riches"; Acxion and InfoBase;, 1995.

International Search Report, Apr. 28, 1998.

"Hancock Carries Insurance Against Risky Service Business", Information Week, Aug. 1986, p.31–35.

Chan Y.Y. et al, An expert system for a portfolio manangement using both frames and production rules, 8th Inter. Workshop Expert System and their application; Avignon, France, May 30 to Jun. 3, 1988, pp. 464–481.

Sullivan, Michael P. "Database Marketing: Frill of Necessity?" Bankers Monthly, Jun. 1993 p. 34.

Mareshal B. and Brans, J.P. "Bankadviser: An Industrial Evaluation System".

Supplementary European Search Report, dated Aug. 9, 1999.

Anand, T.S. et al., *Turning Customer Data Into Dollars*, AT&T Technology, vol. 10, No. 4, 1995, pp. 19–23, XP002110887.

Tuominen, H. et al., Reference model for a marketing information system and its application, Engineering Management Conference, 1994, pp. 185–91, XP002110888.

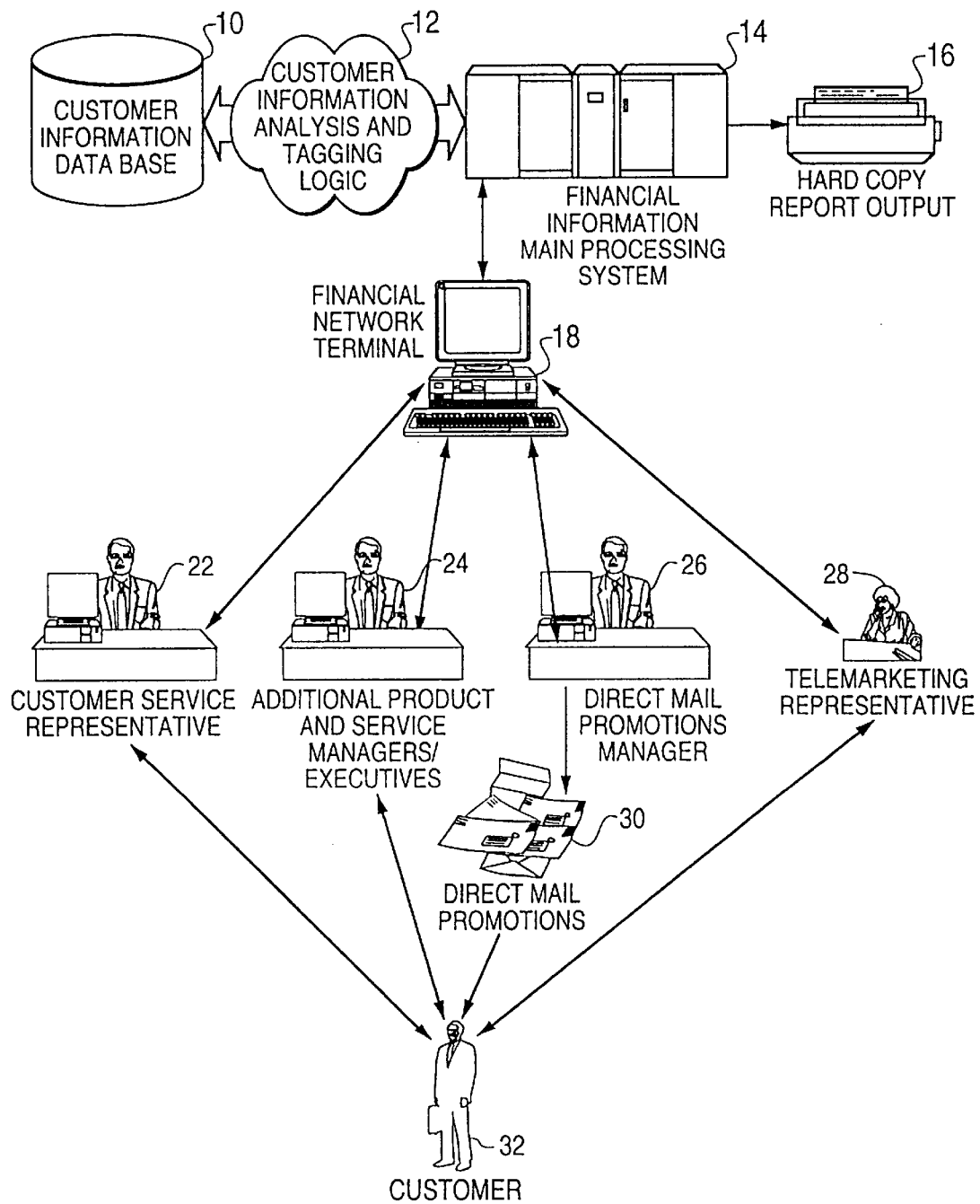

FIG. 2

| BLOCK NUMBER | TEXT | |
|---|---|---|
| 100 | 1. PREMIUM CREDIT CARD POTENTIAL | |
| | Display Message: | PREMIUM CREDIT CARD POTENTIAL: REFER TO PREMIUM CARD EXECUTIVE |
| | Sample Action: | Refer customer to premium executive or inform a premium executive to follow up on this customer's potential to become a premium card customer. |
| 102 | 2. HEAVY TELLER USAGE | |
| | Display Message: | HEAVY TELLER USAGE: STRESS SHIFT TO ELECTRONIC ACCESS |
| | Sample Action: | Offer electronic access services. |
| 104 | 3. FOREIGN TRAVELLER | |
| | Display Message: | TRAVELS ABROAD |
| | Sample Action: | Offer travellers checks, and discuss global banking services. |
| 106 | 4. LIFE STYLE | |
| | Display Message: | LIFE STYLE CHANGE: EXPLORE ADDITIONAL NEEDS |
| | Sample Action: | Discuss new service and product needs based on the customer's life style change. |
| 108 | 5. LOAN MATURITY | |
| | Display Message: | LOAN COMING DUE: STRESS NEW PRODUCTS |
| | Sample Action: | Discuss needs for new services and products. |

FIG. 3

| BLOCK NUMBER | TEXT | |
|---|---|---|
| 110 | 6. CD MATURITY | |
| | Display Message: | CD MATURING: EXPLORE NEW PRODUCTS |
| | Sample Action: | Explore new or additional investment services and products. |
| 112 | 7. NEGATIVE BALANCE FLUX | |
| | Display Message: | NEGATIVE BALANCE FLUCTUATION: CROSS-SELL RELATIONSHIP PRICING PRODUCTS |
| | Sample Action: | Plan, proactively, to retain customer; offer additional services and products. |
| 114 | 8. INVESTMENT SERVICES POTENTIAL | |
| | Display Message: | INVESTMENT SERVICES CUSTOMER POTENTIAL: EXPLORE INVESTMENT NEEDS |
| | Sample Action: | Suggest investment service products. |
| 116 | 9. SECOND MORTGAGE | |
| | Display Message: | SECOND MORTGAGE POTENTIAL: STRESS TAX ADVANTAGES |
| | Sample Action: | Discuss the potential for a second mortgage, include information about tax advantages. |
| 118 | 10. STEADY INCREASE TO SAVINGS PRODUCT | |
| | Display Message: | EXPLORE INVESTMENT/LONG-RANGE PRODUCTS |
| | Sample Action: | Suggest investment service and product offerings. |

FIG. 4

| BLOCK NUMBER | TEXT | |
|---|---|---|
| 120 | 11. PREFERRED LINE | |
| | Display Message: | UPSELL TO SECOND MORTGAGE PRODUCT |
| | Sample Action: | Customer has a high credit line utilization, suggest a second mortgage product. |
| 122 | 12. HEAVY CHECK WRITER | |
| | Display Message: | HEAVY CHECK ACTIVITY: STRESS ELECTRONIC ALTERNATIVES |
| | Sample Action: | Suggest electronic access services. |
| 124 | 13. PREMIUM CREDIT CARD POTENTIAL II | |
| | Display Message: | HIGH PURCHASE VOLUME ON CREDIT CARD: REFER TO PREMIUM EXEC. FOR FOLLOW-UP |
| | Sample Action: | Refer customer to a premium executive for follow up on this customer's potential to become a premium card customer. Also, refer for premium card telemarketing or direct mail promotions. |
| 126 | 14. LIFE TIME VALUE | |
| | Display Message: | CUSTOMERS IN THE HIGHEST PROFIT POTENTIAL DECILE |
| | Sample Action: | High revenue customer; explore additional service and product needs. |

FIG. 5

| BLOCK NUMBER | TEXT | | |
|---|---|---|---|
| 128 | 15. ATTRITION/CUSTOMER NET REVENUE | | |
| | Display Message: | CUSTOMERS LIKELY TO ATTRITE WITH HIGHEST CUSTOMER NET REVENUE CONTRIBUTION | |
| | Sample Action: | Plan, proactively, to retain customer; offer additional services and products. | |
| 130 | 16. COMPETITIVE FINANCIAL SERVICES | | |
| | Display Message: | CUSTOMER USES COMPETITOR: INVESTIGATE SERVICE NEEDS | |
| | Sample Action: | Offer services that may bring over the customer's competing services business. | |
| 132 | 17. BANKING ON PERSONAL COMPUTER | | |
| | Display Message: | CUSTOMER ENROLLED IN DIRECT ACCESS SERVICE | |
| | Sample Action: | Customer uses high end services; market additional upscale products. | |
| 134 | 18. PHONE BANKING | | |
| | Display Message: | CUSTOMER ENROLLED IN PHONE BANKING BILL PAYMENT SERVICE | |
| | Sample Action: | Customer uses high end services; market additional upscale products. | |

FIG. 6

| BLOCK NUMBER | TEXT | |
|---|---|---|
| 136 | 19. SCREEN PHONE | |
| | Display Message: | CUSTOMER ENROLLED IN SCREEN PHONE ACCESS SERVICE |
| | Sample Action: | Customer uses high end services; market additional upscale products. |
| 138 | 20. NON-RESIDENT ALIEN | |
| | Display Message: | CUSTOMER IS NON-RESIDENT ALIEN <NRA>:<br>- STRESS GLOBAL CAPABILITIES<br>- STRESS LIABILITY PRODUCTS |
| | Sample Action: | Offer additional liability, checking and savings products; also explore global banking needs. |
| 140 | 21. NEW TO RETAIL BANK | |
| | Display Message: | CUSTOMER IS NEW TO RETAIL BANK: CROSS-SELL SERVICES AND PRODUCTS |
| | Sample Action: | High success probability to market additional services and products to a new customer. |
| 142 | 22. PERSONAL COMPUTER PURCHASER | |
| | Display Message: | CUSTOMER IS PURCHASER OF PERSONAL COMPUTER SOFTWARE OR HARDWARE |
| | Sample Action: | Offer electronic access services, and recommend direct mail promotions. |

FIG. 7

| BLOCK NUMBER | TEXT | | |
|---|---|---|---|
| 144 | 23. SAFE DEPOSIT BOX | Display Message: | CUSTOMER HAS SAFE DEPOSIT BOX: EXPLORE INVESTMENT OPPORTUNITIES |
| | | Sample Action: | Suggest investment service and product offerings. |

FIG. 8

```
-------CUSTOMER PROFILE-------
------PERSONAL INFORMATION------    HH#: 999999999  CUS#: 999999999  HOME:
FIRST MI. LAST                      P/B: LAST, FIRST                 EMPL:
ADDRESS LINE 1                      FINANCIALS------CURR-----HIST--RANK
ADDRESS LINE 2                      NET REVENUE:         99     99      99
ADDRESS LINE 3                      DEPOSITS    :     9,999  9,999      99
                                    LOANS       :   999,999 999,999     99
H: 999-999-9999    B: 999-999-9999  INVESTMENT  :
------BANKING PROFILE------         OTHER FEE   :
CHK WRITN : ## TELLER TRANS : ##    ------OPEN PRODUCTS------
------BANKING CENTER------          CHK:   CKP:   RDY:   1MG:   TRN:
OVERALL   : ## DEPOSITS    : ##     SAV:   BCD:   ILS:   CRS:   INS:
LOCATIONS : ## WITHDRAWALS :        MMA:   BMC:   TAL:   CMM:   OTH:
NON-MKT   :    TRANSFERS   :        CDS:   T&E:   2MG:   BNC:
STMT UPDS :    PAYMENTS    :        ------CARD USAGE PATTERNS------
                                    PERCENT UTL:           SEG:
-SERVICES--|--ELECTRONIC--|PHONEBANK- B&P:  T&E:  CLD:  ADV:  ITL:
C-A-CSH :  | DIR ACC:     | TPIC:    ----DOMICILED/PREFERRED BRANCHES----
SFTY CK :  | BILL PY :    | INFO:    D:
DIR DEP :  | ENH TEL :    | TRSF:    1:
CB:        |              | PAYM:    2:

PF1-HELP  2-JUMP  3-MENU  7-BWD  8-FWD  9-NEEDS/NOTES  10-SELECT  11-SEARCH
```

FIG. 9

CUSTOMER PROFILE

FIRST MI. LAST ---------- ADDRESS LINE 1

---------- NEEDS IDENTIFICATION ----------

01-PREMIUM CREDIT CARD POTENTIAL: REFER TO PREMIUM CARD EXECUTIVE

---------- CUSTOMER AND TELEMARKETING NOTES ----------

CUSTOMER: _____

TELEMRKT: _____

PF1-HELP  2-JUMP  3-MENU  7-BWD  9-PROFILE  10-SELECT  11-SEARCH  12-UPD

FIG. 10

MONTHLY CUSTOMER DISTRIBUTION

| CONTACT STRATEGY TAGS | MONTH/YEAR | MONTH/YEAR | MONTH/YEAR | MONTH/YEAR | MONTH/YEAR | MONTH/YEAR | MONTH/YEAR |
|---|---|---|---|---|---|---|---|
| 1. Premium Credit Card Potential | | | | | | | |
| 2. Heavy Teller Usage | | | | | | | |
| 3. Foreign Traveller | | | | | | | |
| 4. Life Style | | | | | | | |
| 5. Loan Maturity | | | | | | | |
| 6. CD Maturity | | | | | | | |
| 7. Negative Balance Flux | | | | | | | |
| 8. Investment Services Potential | | | | | | | |
| 9. Second Mortgage | | | | | | | |
| 10. Steady Increase to Savings Product | | | | | | | |
| 11. Preferred Line | | | | | | | |
| 12. Heavy Check Writer | | | | | | | |
| 13. Premium Credit Card Potential II | | | | | | | |
| 14. Life Time Value | | | | | | | |
| 15. Attrition/Customer Net Revenue | | | | | | | |
| 16. Competitive Financial Services | | | | | | | |
| 17. Banking on Personal Computer | | | | | | | |
| 18. Phone Banking | | | | | | | |
| 19. Screen Phone | | | | | | | |
| 20. Non-Resident Alien | | | | | | | |
| 21. New to Retail Bank | | | | | | | |
| 22. Personal Computer Purchaser | | | | | | | |
| 23. Safe Deposit Box | | | | | | | |

FIG. 11

CUSTOMER DISTRIBUTION BY MARKETS

Data Month:

| TAG/Customers in Market | All Mkts | Market 1 | Market 2 | Market 3 | Market 4 | Market 5 | Market 6 |
|---|---|---|---|---|---|---|---|
| 1. Premium Credit Card Potential | | | | | | | |
| 2. Heavy Teller Usage | | | | | | | |
| 3. Foreign Traveller | | | | | | | |
| 4. Life Style | | | | | | | |
| 5. Loan Maturity | | | | | | | |
| 6. CD Maturity | | | | | | | |
| 7. Negative Balance Flux | | | | | | | |
| 8. Investment Services Potential | | | | | | | |
| 9. Second Mortgage | | | | | | | |
| 10. Steady Increase to Savings Product | | | | | | | |
| 11. Preferred Line | | | | | | | |
| 12. Heavy Check Writer | | | | | | | |
| 13. Premium Credit Card Potential II | | | | | | | |
| 14. Life Time Value | | | | | | | |
| 15. Attrition/Customer Net Revenue | | | | | | | |
| 16. Competitive Financial Services | | | | | | | |
| 17. Banking on Personal Computer | | | | | | | |
| 18. Phone Banking | | | | | | | |
| 19. Screen Phone | | | | | | | |
| 20. Non-Resident Alien | | | | | | | |
| 21. New to Retail Bank | | | | | | | |
| 22. Personal Computer Purchaser | | | | | | | |
| 23. Safe Deposit Box | | | | | | | |
| TOTAL CUSTOMERS | | | | | | | |

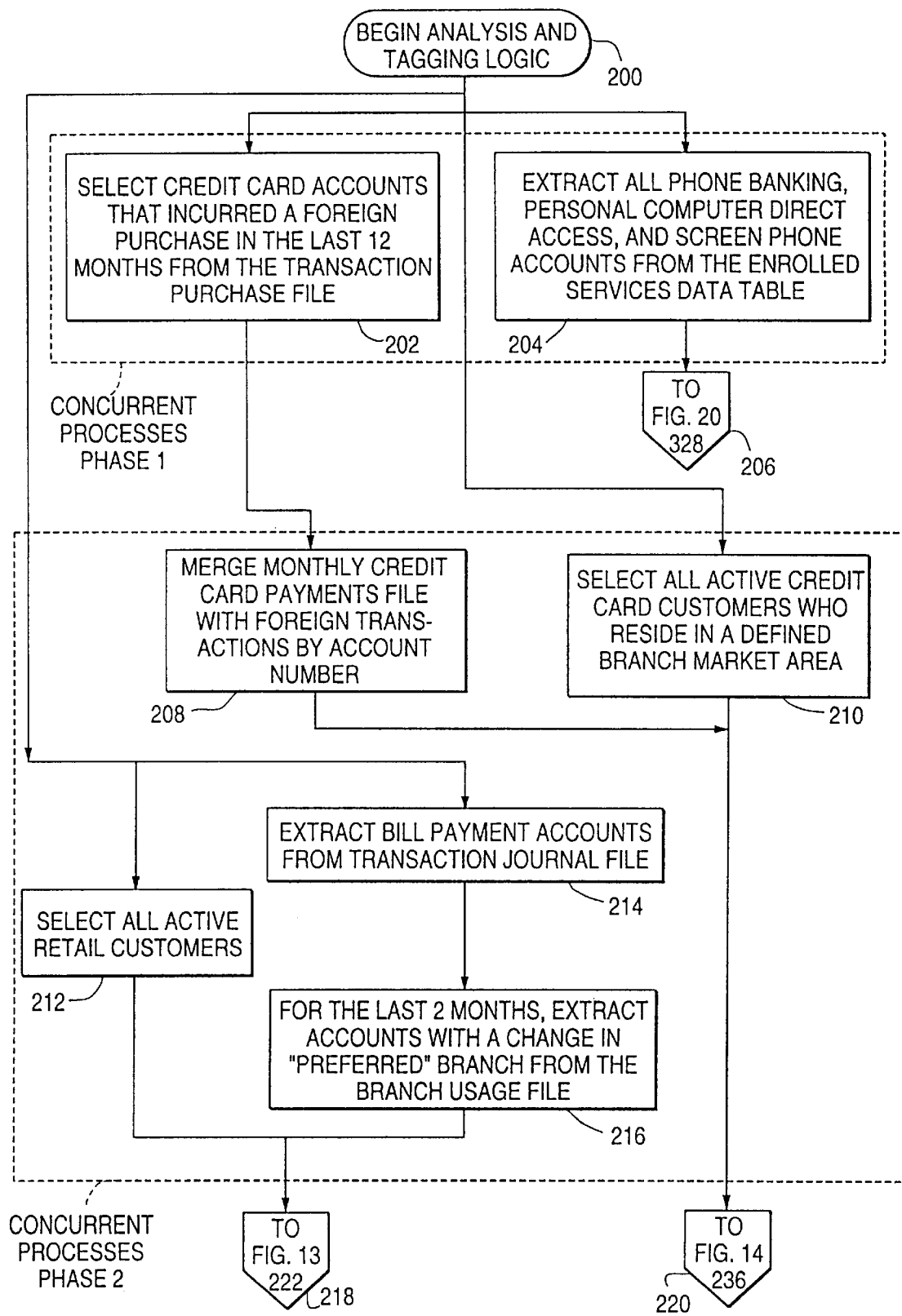

METHOD AND SYSTEM FOR ANALYZING AND HANDLING THE CUSTOMER FILES OF A FINANCIAL INSTITUTION

This application is a Continuation of Ser. No. 08/616,185, filed on Mar. 15, 1996, abandoned.

NOTICE OF COPYRIGHTED MATERIAL IN DISCLOSURE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to a system and method for strategically identifying and communicating the availability of additional products to the customers of a financial institution. More specifically, the present invention relates to a system and method to "tag" the files of customers showing specific characteristics indicative of the customer's potential need for additional products. These tags, in turn, provide representatives of the financial institution with readily accessible and accurate information about potential sales opportunities when interacting with customers.

BACKGROUND OF THE INVENTION

As competition between financial institutions increases there is a growing need for financial institutions to identify opportunities to sell a wider range of their products to existing clients. For example, due to recent regulatory changes, traditional banks have a wider range of products and services—including investment products and services—to offer to customers. The need to quickly and accurately identify a marketing opportunity for a specific customer based upon information about the customer is of great importance to financial institutions.

A financial institution may have a great deal of useful information about its customers to be used, in part, for identifying opportunities for marketing additional products and services to its customers. However, the process of sifting through this information to identify marketing opportunities for each specific customer is daunting and time-consuming.

Further, historically the nature of the interaction between customers and financial institution is not conducive to researching and acting on marketing opportunities by representatives of a financial institution. For example, if the institution is a bank, the interaction time for a traditional bank/customer event (for example, depositing a check, getting cash and/or transferring funds) is simply too short to provide the financial institution's representative ample opportunity to meaningfully analyze the customer information and act upon such any analysis.

Further, the nature of the information generally available to the representative of a financial institution may not be conducive to identifying marketing opportunities. For example, if the institution is a bank, a teller generally has access to the customer's current information. This information may be characterized as a "snapshot" of the customer's current status with the bank. Because this type of information is "static" in that it shows the customer's current status, it cannot show the trends of the customer over time. However, analyzing a customer's activity over time can identify important trends. For example, if the number of checks a customer writes starts to decrease, this trend may be indicative that the customer is moving his or her banking business to another institution. Identification of this trend is of real importance to the bank because the bank may wish to take action to dissuade the customer from taking his or her business elsewhere. However, because when dealing with the customer, the representative may not have ready access to information about a customer over time, the ability of the representative to perform a "dynamic" analysis to identify trends is hampered.

As used herein, the term "product" is not limited to a physical entity and is meant to include financial services of any kind including investment services, brokerage services, stock purchases, financial instrument purchases, mortgages, purchases of certificates of deposit (CD's), safety deposit box rentals, electronic home banking—through a personal computer, screen phone or other electronic means—and loans of all kinds including home improvement loans, student loans, car loans and others.

Therefore, there is a need in the industry for a method and system to access and analyze information about the customers of a financial institution in order to identify opportunities to expand business with those customers. Further, there is a need to communicate those opportunities to the representatives of the financial institution in a timely and concise way.

SUMMARY OF THE INVENTION

It is an object of the invention to overcome the shortcomings discussed above with a system and method for strategically identifying and communicating the availability of additional products to the customers of a financial institution. The system and method analyzes the current and past information about a customer and, as a result of that analysis, identifies marketing opportunities to expand the financial institution's relationship with the customer. Once an opportunity is identified, the customer's file is "tagged" so that representatives of the financial institution when interacting with the customer—by, for example, electronically accessing the customer's account information in response to the customer's request to deposit a check—is quickly and clearly apprised of the potential marketing opportunity. In turn, the representative communicates the availability of the potential new product and/or suggests that the customer speak with another representative specializing in that product. The system and method may also be used with telemarketing functions or direct mail operations.

BRIEF DESCRIPTION OF THE DRAWINGS

FIG. 1 is an overview block diagram of the components and personnel which comprise this Method and System for Analyzing and Handling the Customer Files of a Financial Institution.

FIG. 2 is a text table showing the customer information summary tag titles with their on-screen display message and a sample course of action that may occur because of a customer's information record having that tag attached.

FIG. 3 is a continuation of the text table from FIG. 2.

FIG. 4 is a continuation of the text table from FIG. 3 and begins on FIG. 2.

FIG. 5 is a continuation of the text table from FIG. 4 and begins on FIG. 2.

FIG. 6 is a continuation of the text table from FIG. 5 and begins on FIG. 2.

FIG. 7 is a continuation of the text table from FIG. 6 and begins on FIG. 2.

FIG. 8 is an illustration of a sample customer profile financial network terminal display screen. This shows the unsummarized customer information display format.

FIG. 9 is an illustration of a tag summary customer profile financial network terminal display screen. This shows a customer profile record with a summary tag attached, that was created by the Method and System for Analyzing and Handling the Customer Files of a Financial Institution.

FIG. 10 is a sample report format which would show the monthly totals for the number of customers that had each tag attached.

FIG. 11 is a sample report format which would show the number of attached tags within one month, first in a total for all financial institution markets and then breaking down a column for each independent market's totals.

FIG. 12 is the beginning figure of the processing flow diagrams for the Method and System for Analyzing and Handling the Customer Files of a Financial Institution.

DETAILED DESCRIPTION OF THE PREFERRED EMBODIMENT

Figure 13:
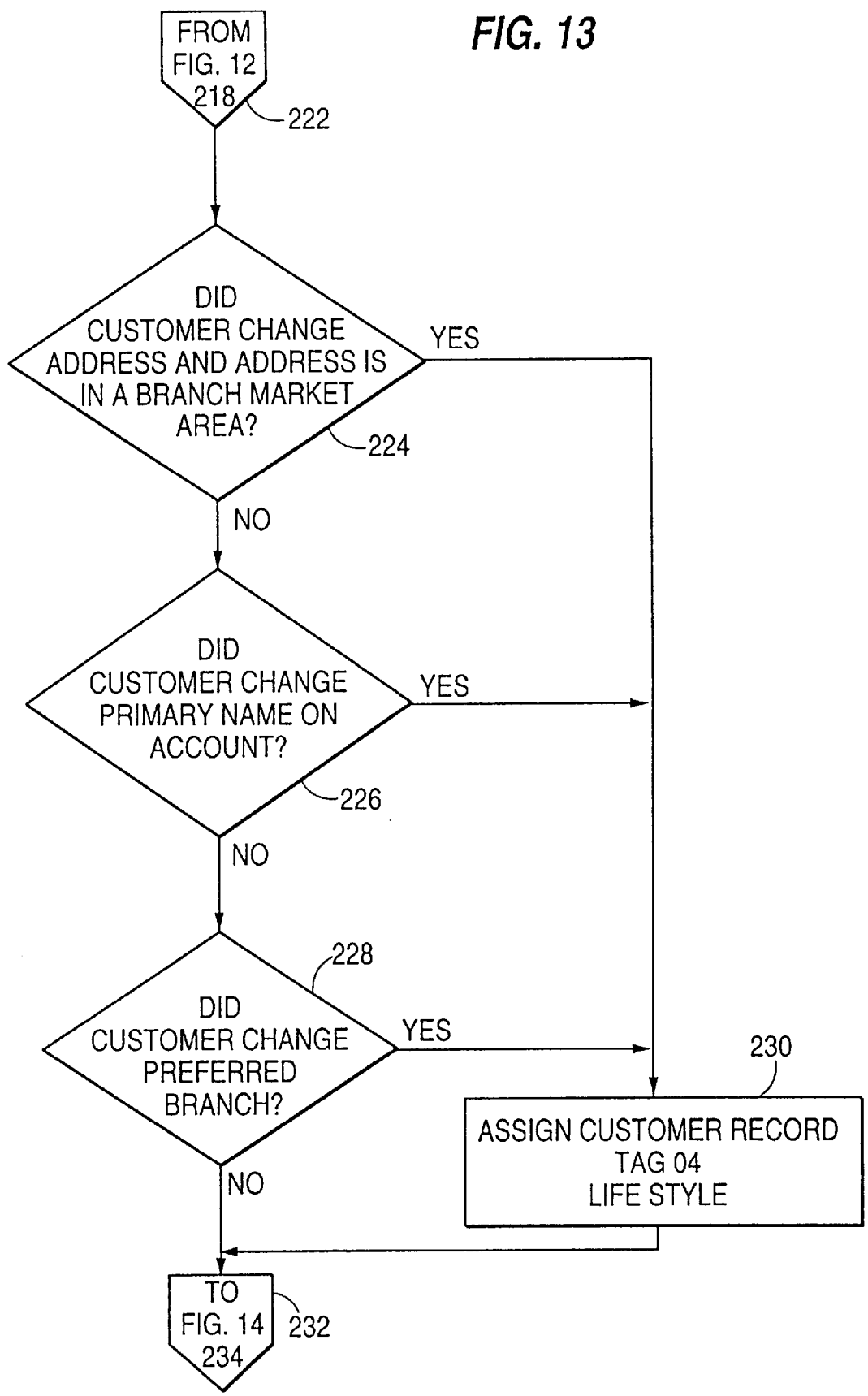
FIG. 13 is the tagging logic criteria for tag number 4-Life Style.

This method and system uses a customer information profile which is periodically updated and resides in the Financial Information Main Processing System (FIG. 1 Block 14). Customer profile information (Block 10) is processed through the analysis and tagging logic (Block 12), where several customer statistics are compared against the predefined tagging criteria.

A customer's record may have no tags appended or may have from one to all of the defined tags appended. Each tag evaluates the customer's information against its defined criteria and will become part of that customer's record if the criteria are met. This current implementation of the process only illustrates the use of twenty three tag attachments. The process is, however, not limited to only these twenty three. For example, in the current system a total of up to ninety nine tags and criteria, to identify customer records that should have those tags attached, can be created and integrated into this system and, by modifying the system, any number of tags may be used.

The tags, as defined in FIG. 2 through FIG. 7, are marketing aids. The existence of one to several tags on a customer's record, helps the Customer Service Representative (CSR) (Block 22) or another member of the institution staff (Block 24, 26 or 28) to become more creative and sales oriented. The tags assist in analyzing a customer's current and future banking needs and allows for more directed marketing to occur. These tags are made available to the institution staff by either the on-line terminal (Block 18) access, as illustrated in the sample screens on FIGS. 8 and 9, or by a version of a hard copy report format (Block 16). The sample reports, as shown in FIGS. 10 and 11, illustrate two examples of how the customer tag information can be organized and reported.

Marketing, based on the attached tags, may occur interactively with the customer (Block 32) during a consultation with a CSR 22 or during a telephone session with a TeleMarketing Representative (Block 28). During a session with a CSR 22, the customer 32 may be referred to another Manager/Executive (Block 24) who may be better able to assist the customer in their banking needs. In addition to interactive marketing, direct mail promotions (Block 30) may be directed, by a Direct Mail Promotions Manager (Block 26), to specific customers based on tags that indicate a promotion could be of value to that customer.

The Method and System for Analyzing and Handling the Customer Files of a Financial Institution (FIG. 1) is symbolically flow charted beginning on FIG. 12 at block 200. The Analysis and Tagging Logic processing is a multi-threaded process which performs concurrent tasks as illustrated by tasks grouped with a dotted line box. This current implementation of the process only illustrates the use of twenty three tag attachments. The process is, however, not limited to only these twenty three. A total of up to ninety nine tags and criteria, to identify customer records that should have those tags attached, can be created and integrated into this system and, by appropriately modifying the system, additional tags may be used.

The processing starts with phase one of the concurrent processing. This includes determining whether the customer's credit card account shows a foreign purchase in the last twelve months from the transaction purchase file (block 202). Concurrent with the tasks at block 202, the phone banking, personal computer direct access, and screen phone accounts are extracted from the enrolled services data table (block 204).

Phase two of the concurrent processing has the following processes: (1) Selection of all active retail customers (block 212); (2) Selection of all active credit card customers who reside in a defined branch market area (block 210); (3) Merging results of the foreign purchases selection (block 202) with the monthly credit card payments file (block 208); and (4) Extracting the bill payment accounts from the transaction journal file (block 214), then extract of the accounts with a preferred branch change indication in the last two months from the branch usage file (block 216).

If the customer information indicates a change of address that is in a branch market area (YES branch from FIG. 13 block 224); or a primary name change on their account (YES branch from block 226); or a change in preferred branch (YES branch from block 228); then the customer record will have TAG 4-LIFE STYLE (FIG. 2 block 106) appended to its information (block 230). If (FIG. 2 block 106) appended to its information (block 230). If none of the TAG 4 criteria are met (NO branch from block 224, 226 and 228), TAG 4 will not be appended to the customer record.

Figure 14:
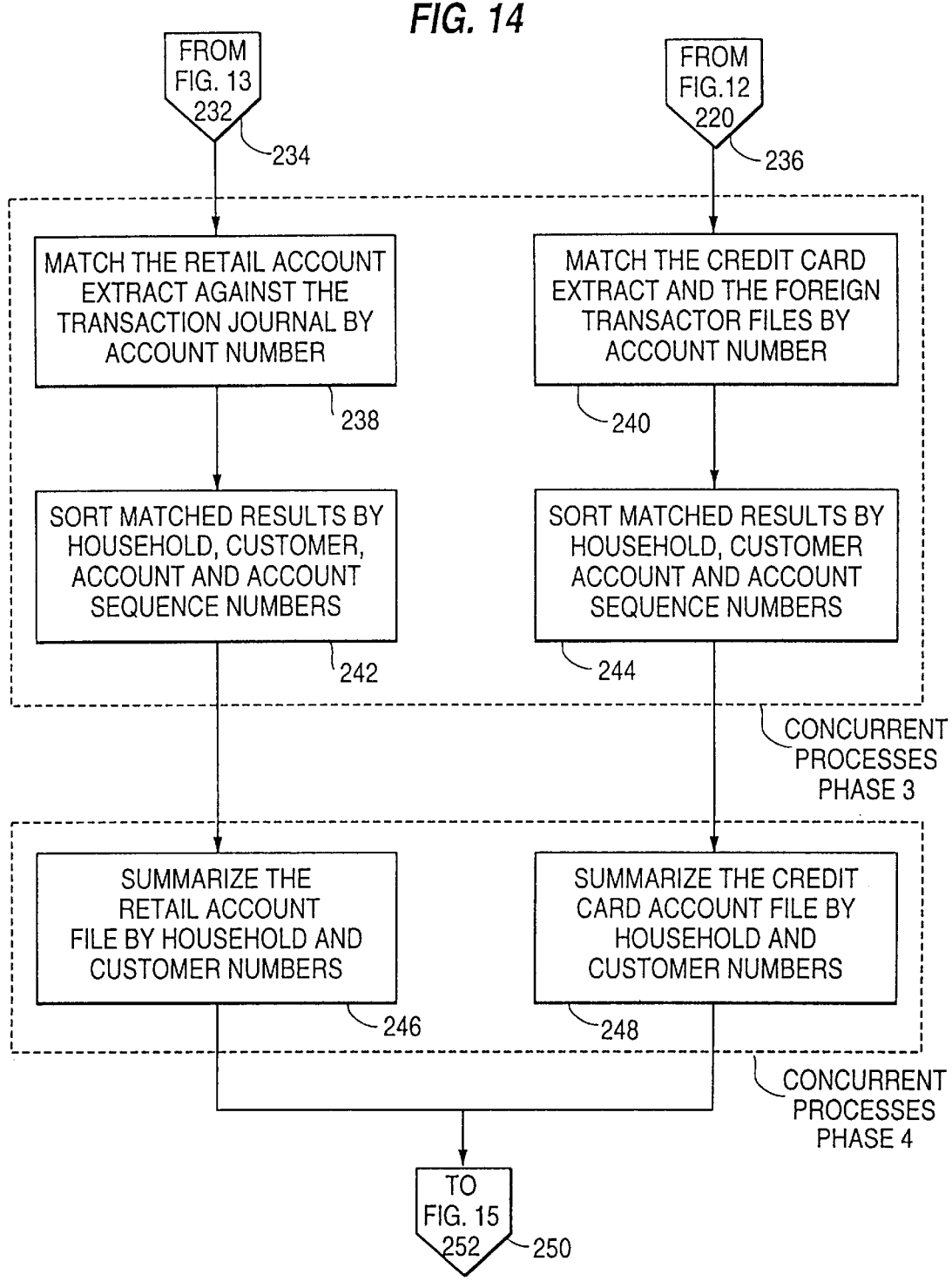
FIG. 14 diagrams the continuation of the customer information file management infrastructure.
Figure 15:
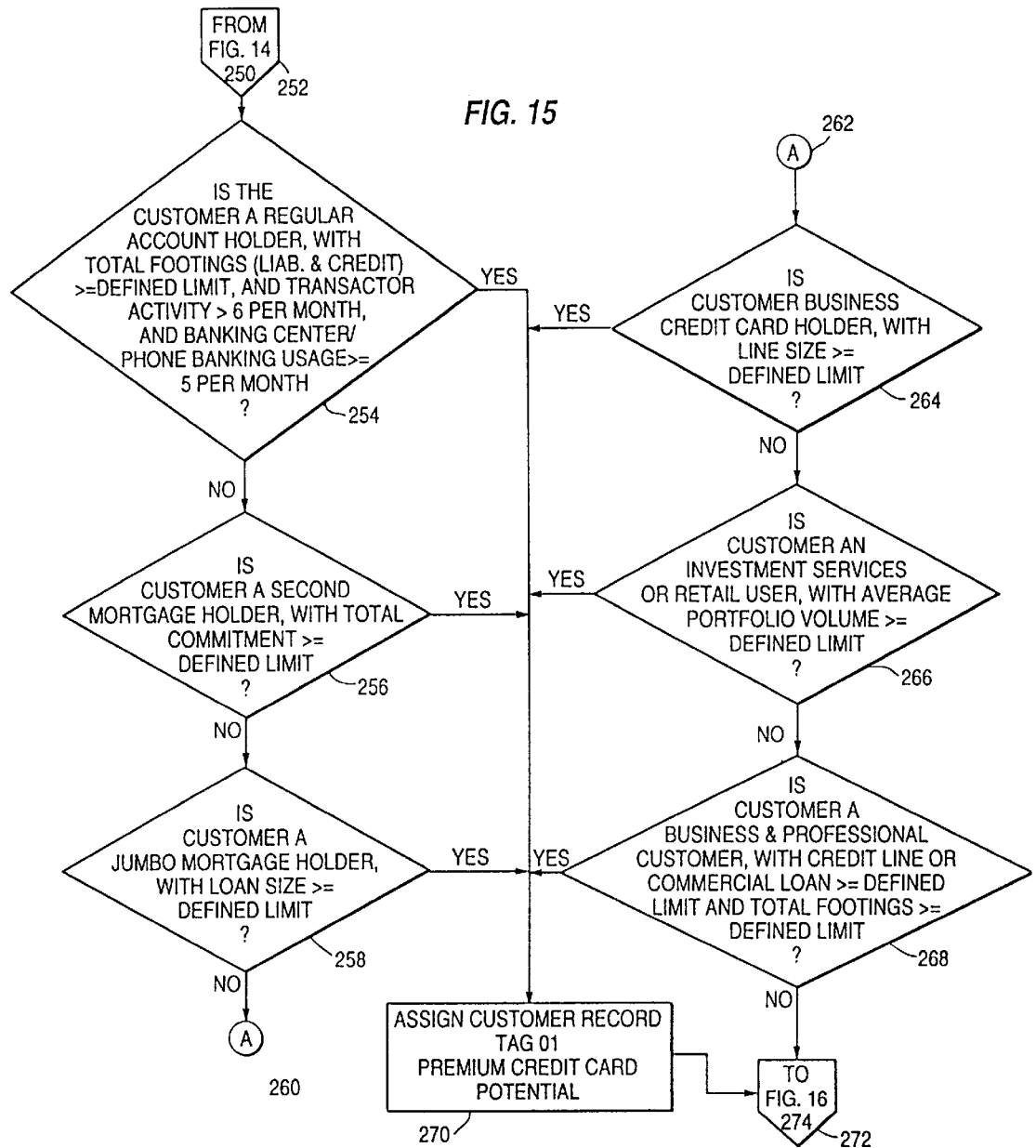
FIG. 15 is the tagging logic criteria for tag number 1-Premium Credit Card Potential.

Phase three of concurrent processing has the following processes: (1) Matching extraction of the retail accounts with the transaction journal by account number (FIG. 14 block 238); (2) Sorting the matched results of block 238 by household, customer, account and account sequence numbers (block 242); (3) Matching the credit card extraction with the foreign transactor files by account number (block 240); and (4) Sorting the results of block 240 by household, customer, account and account sequence numbers (block 244).

Phase four of concurrent processing has the following processes: (1) Summarizing the retail account file, as passed from block 242, by household and customer numbers (block 246); and (2) Summarizing the credit card account file, as passed from block 244, by household and customer numbers (block 248).

If the customer information indicates the customer is a regular account holder with total "footings" (liability and credit) being greater than or equal to a defined limit, and their transaction activity is greater than six times per month and banking center/phone banking usage is greater than or equal to five times per month (YES branch from block 254); or the customer is a second mortgage holder, with a total commitment that is greater than or equal to a defined limit (YES branch from block 256); or the customer is a jumbo mortgage holder, with a loan size greater than or equal to a defined limit (YES branch from block 258); or the customer is a business credit card holder, with a credit line size greater than or equal to a defined limit (YES branch from block 264); or the customer is an investment services or retail user, with an average portfolio volume that is greater than or equal to a defined limit (YES branch from block 266); or the customer is a business and professional customer, with a credit line or commercial loan that is greater than or equal to a defined limit and their total footings are greater than or equal to a defined limit (YES branch from block 268); then the customer record will have TAG 1-PREMIUM CREDIT CARD POTENTIAL (FIG. 2 block 100) appended to its information (block 270). If none of the TAG 1 criteria are met (NO branch from block 254, 256, 258, 264, 266 and 268), TAG 1 will not be appended to the customer record.

Figure 16:
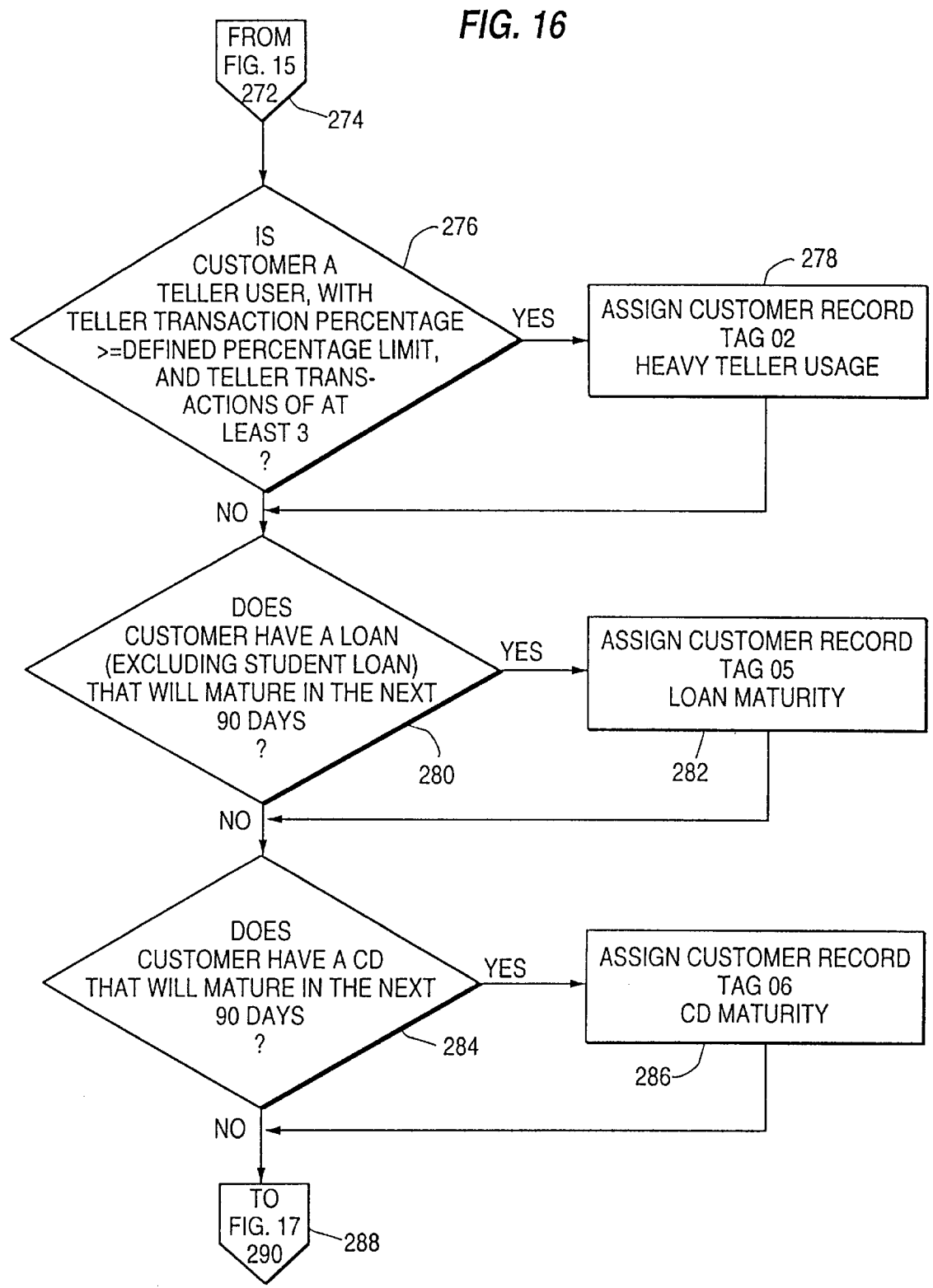
FIG. 16 is the tagging logic criteria for tag number 2-Heavy Teller Usage, number 5-Loan Maturity, and number 6-CD Maturity.
Figure 17:
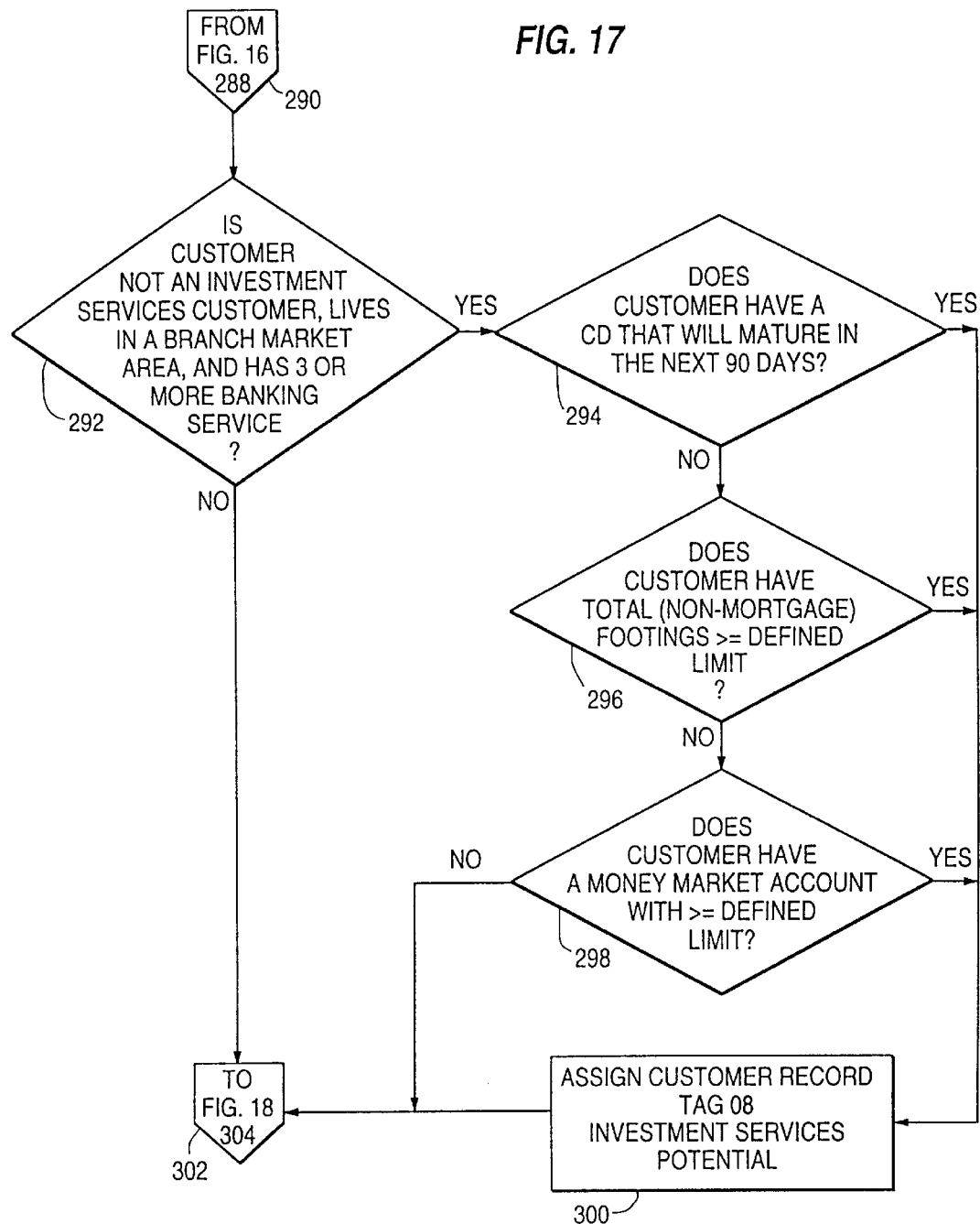
FIG. 17 is the tagging logic criteria for tag number 8-Investment Services Potential.

If the customer information indicates the customer is a teller user, with teller transaction percentage being greater than or equal to a defined percentage limit, and they have at least three teller transactions (YES branch from FIG. 16 block 276); then the customer record will have TAG 2-HEAVY TELLER USAGE (FIG. 2 block 102) appended to its information (block 278). if none of the TAG 2 criteria are met (NO branch from block 276) TAG 2 will not be appended to the customer record.

If the customer information indicates the customer has a loan (excluding a student loan) that will mature in the next ninety days (YES branch from block 280); then the customer record will have TAG 5-LOAN MATURITY (FIG. 2 block 108) appended to its information (block 282). If none of the TAG 5 criteria are met (NO branch from block 280) TAG 5 will not be appended to the customer record.

If the customer information indicates the customer has a CD that will mature in the next ninety days (YES branch from block 284); then the customer record will have TAG 6-CD MATURITY (FIG. 3 block 110) appended to its information (block 286). If none of the TAG 6 criteria are met (NO branch from block 284) TAG 6 will not be appended to the customer record.

If the customer information indicates the customer is not currently an investment services customer, they live in a branch market area and have three or more banking services (YES branch from block 292); and that the customer has a CD that will mature in the next ninety days (YES branch from block 294); or the customer has total non-mortgage footing that are greater than or equal to a defined limit (YES branch from block 296); or the customer has a money market account with a value greater than or equal a defined limit (YES branch from block 298); then the customer record will have TAG 8-INVESTMENT SERVICES POTENTIAL (FIG. 3 block 114) appended to its information (block 300). If none of the TAG 8 criteria are met (NO branch from block 292 or from block 294, 296 and 298) TAG 8 will not be appended to the customer record.

Figure 18:
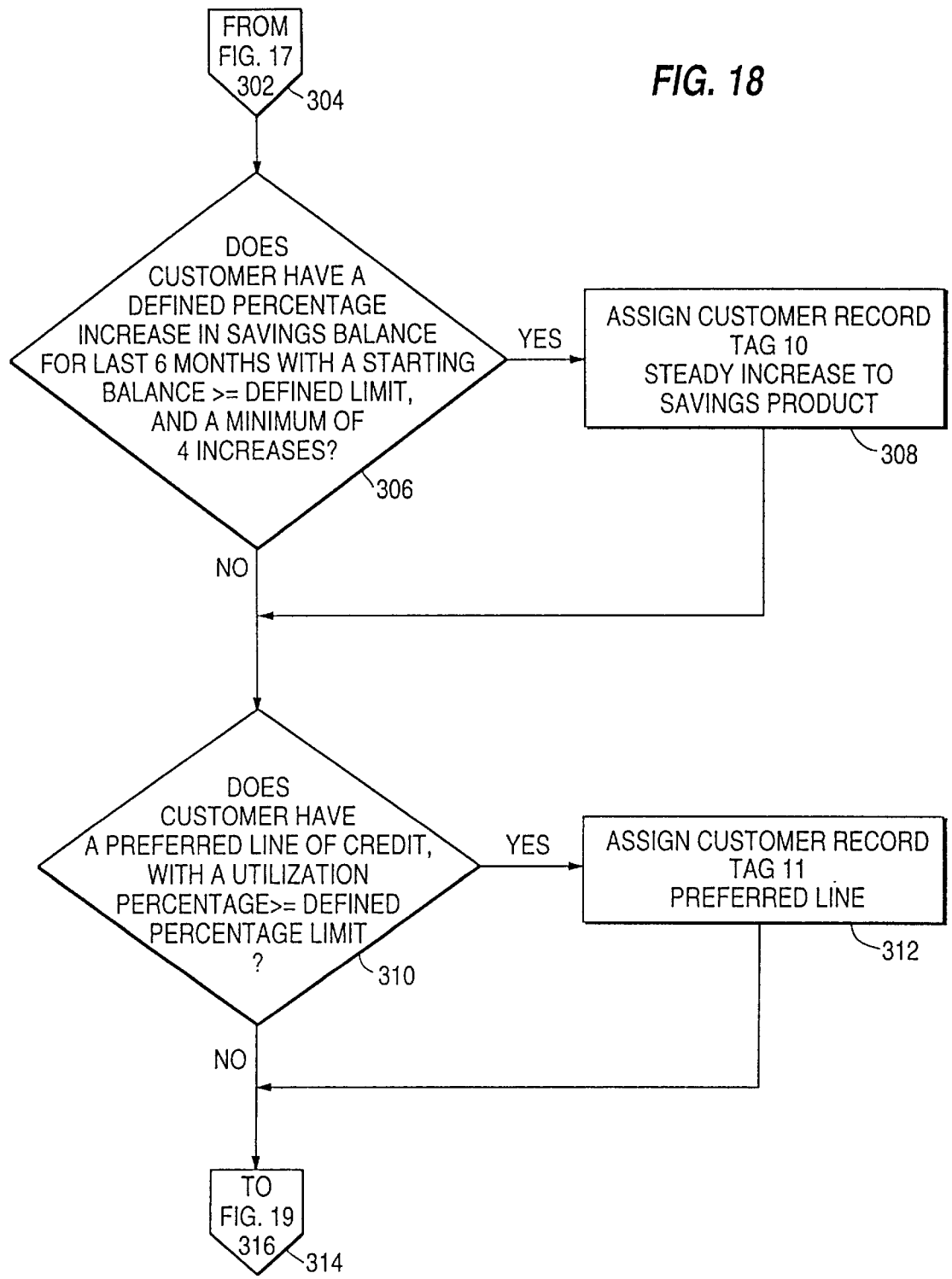
FIG. 18 is the tagging logic criteria for tag number 10-Steady Increase To Savings Product, and number 11-Preferred Line.

If the customer information indicates the customer has an increase in their savings balance for the last 6 months that is greater than or equal to a defined percentage with a starting balance of greater than or equal to a defined limit, and there were at least four increases (YES branch from FIG. 18 block 306); then the customer record will have TAG 10-STEADY INCREASE TO SAVINGS PRODUCT (FIG. 3 block 118) appended to its information (block 308). If none of the TAG 10 criteria are met (NO branch from block 306) TAG 10 will not be appended to the customer record.

If the customer information indicates the customer has a preferred line of credit with a utilization percentage that is greater than or equal to a defined percentage limit (YES branch from block 310); then the customer record will have TAG 11-PREFERRED LINE (FIG. 4 block 120) appended to its information (block 312). If none of the TAG 11 criteria are met (NO branch from block 310) TAG 11 will not be appended to the customer record.

Figure 19:
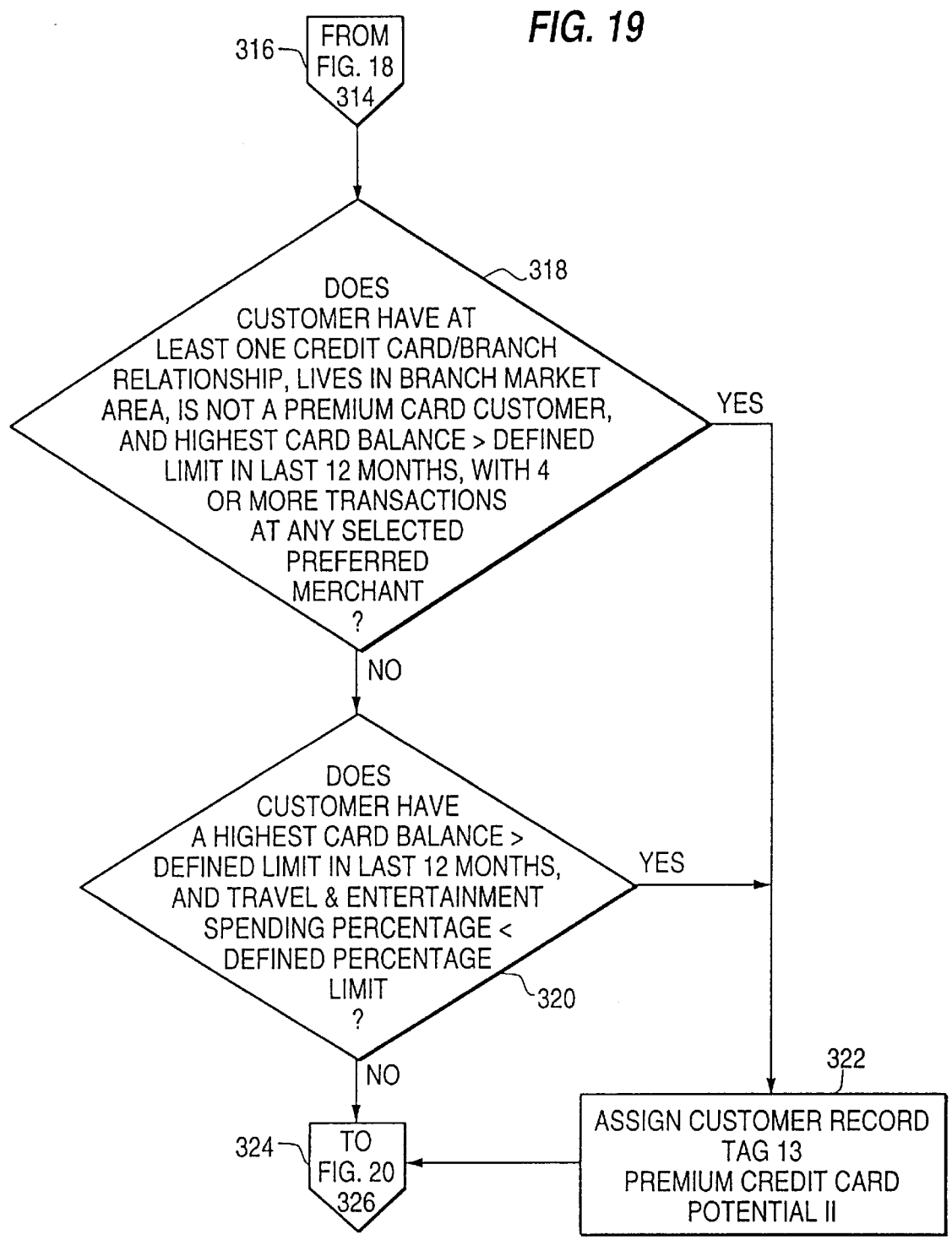
FIG. 19 is the tagging logic criteria for tag number 13-Premium Credit Card Potential II.

If the customer information indicates the customer has at least one credit card/branch relationship, they live in a branch market area, their highest card balance in the last twelve months was greater than a defined limit, and they transacted at four or more of the selected preferred merchants (YES branch from FIG. 19 block 318); or the customer had a highest card balance in the last twelve months that was greater than a defined limit and their travel and entertainment spending percentage was less than a defined percentage limit (YES branch from block 320); then the customer record will have TAG 13-PREMIUM CREDIT CARD POTENTIAL II (FIG. 4 block 124) appended to its information (block 322). If none of the TAG 13 criteria are met (NO branch from block 318, and 320), TAG 13 will not be appended to the customer record.

Figure 20:
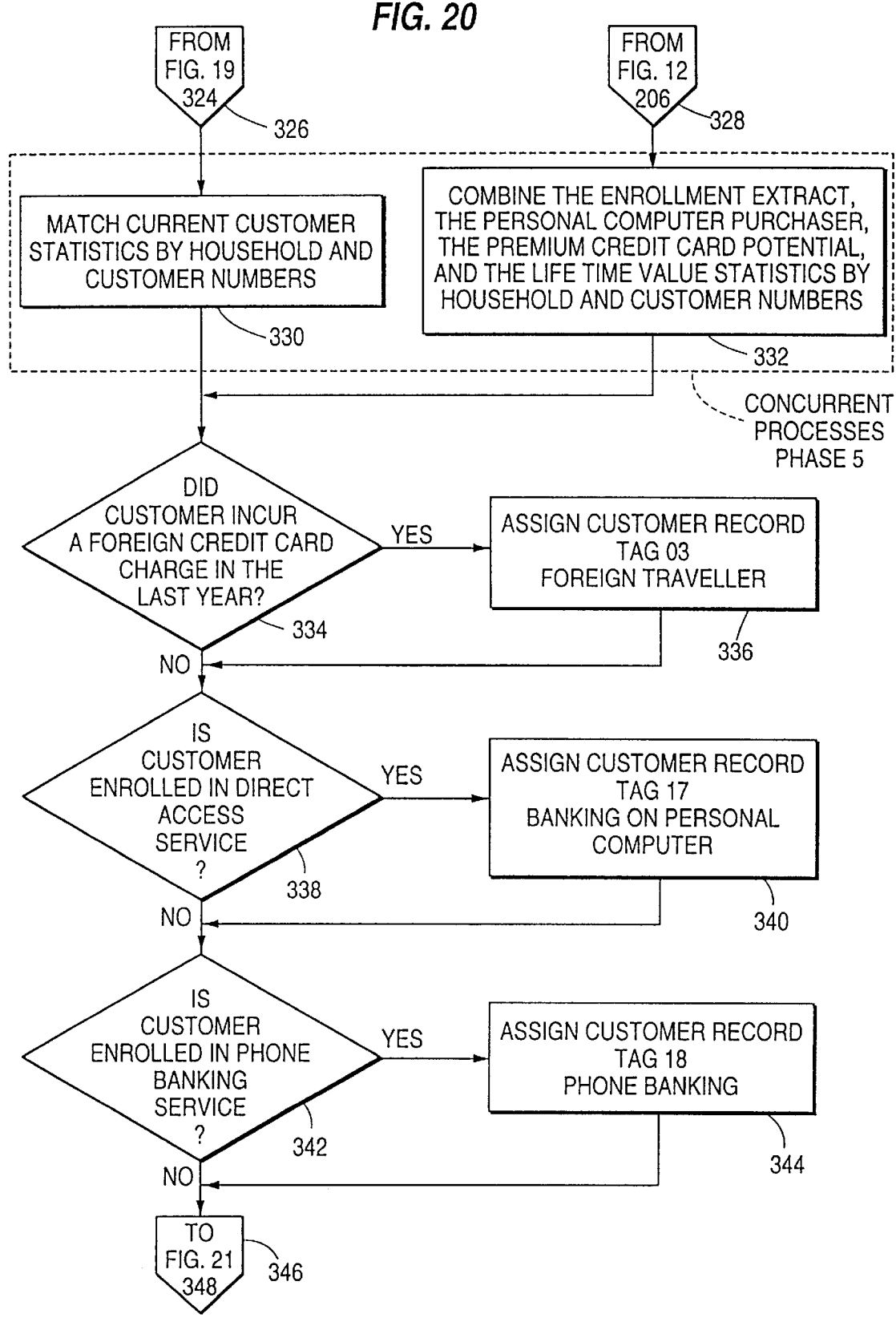
FIG. 20 diagrams more customer file management infrastructure and the tagging logic criteria for tag number 3-Foreign Traveller, number 17-Banking On Personal Computer, and number 18-Phone Banking.

Phase five of concurrent processing has the following processes: (1) Matching the current customer statistics by household and customer numbers (FIG. 20 block 330); and (2) Combining the enrollment extraction information, the personal computer purchaser, premium credit card potential and life time value statistics by household and customer numbers (block 332).

If the customer information indicates the customer incurred a foreign credit card charge in the last year (YES branch from block 334); then the customer record will have TAG 3-FOREIGN TRAVELLER (FIG. 2 block 104) appended to its information (block 336). If none of the TAG 3 criteria are met (NO branch from block 334) TAG 3 will not be appended to the customer record.

If the customer information indicates the customer is enrolled in the direct access service (YES branch from block 338); then the customer record will have TAG 17-BANKING ON PERSONAL COMPUTER (FIG. 5 block 132) appended to its information (block 340). If none of the TAG 17 criteria are met (NO branch from block 338) TAG 17 will not be appended to the customer record.

If the customer information indicates the customer is enrolled in the phone banking service (YES branch from block 342); then the customer record will have TAG 18-PHONE BANKING (FIG. 5 block 134) appended to its information (block 344). If none of the TAG 18 criteria are met (NO branch from block 342) TAG 18 will not be appended to the customer record.

Figure 21:
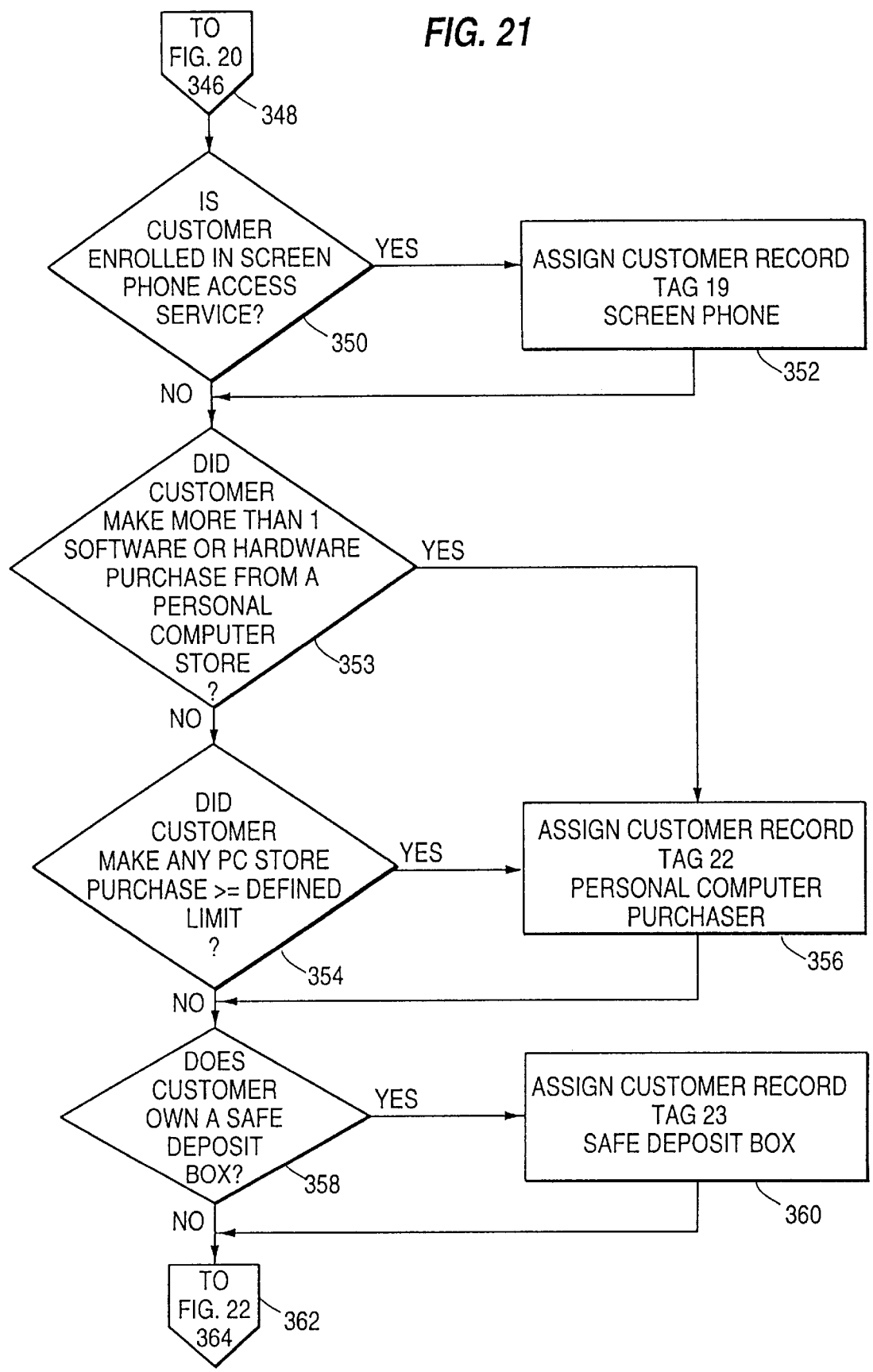
FIG. 21 is the tagging logic criteria for tag number 19-Screen Phone, number 22-Personal Computer Purchaser, and number 23-Safe Deposit Box.

If the customer information indicates the customer is enrolled in the screen phone access service (YES branch from FIG. 21 block 350); then the customer record will have TAG 19-SCREEN PHONE (FIG. 6 block 136) appended to its information (block 352). If none of the TAG 19 criteria are met (NO branch from block 350) TAG 19 will not be appended to the customer record.

If the customer information indicates the customer made more than one software or hardware purchase from a personal computer store (YES branch from block 353); or the customer made any purchase from a PC store that was greater than or equal to a defined limit (YES branch from block 354); then the customer record will have TAG 22-PERSONAL COMPUTER PURCHASER (FIG. 6 block 142) appended to its information (block 356). If none of the TAG 22 criteria are met (NO branch from block 353 and 354) TAG 22 will not be appended to the customer record.

If the customer information indicates the customer owns a safe deposit box (YES branch from block 358); then the customer record will have TAG 23-SAFE DEPOSIT BOX (FIG. 7 block 144) appended to its information (block 360). If none of the TAG 23 criteria are met (NO branch from block 358) TAG 23 will not be appended to the customer record.

Figure 22:
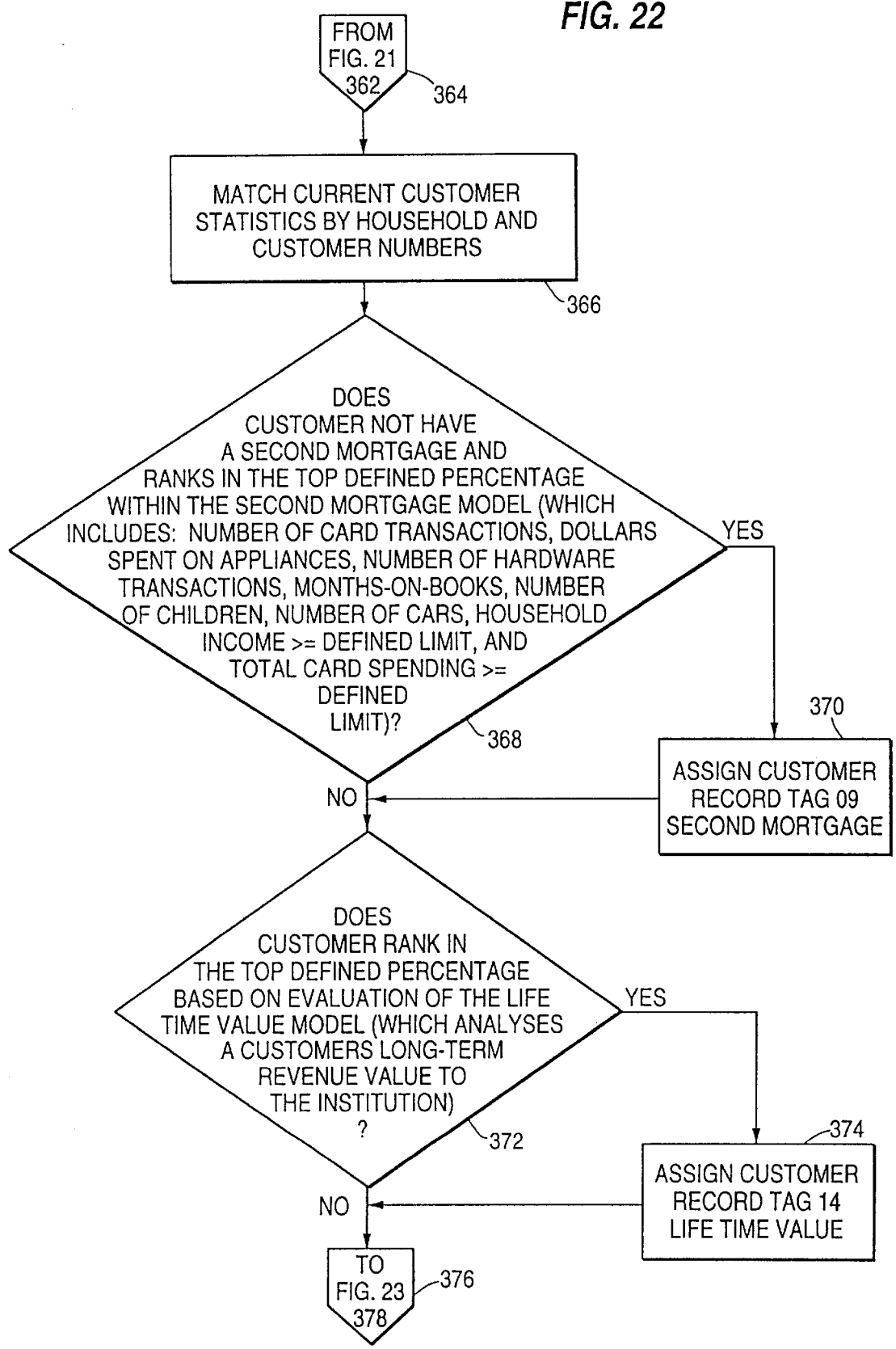
FIG. 22 diagrams more customer file management infrastructure and the tagging logic criteria for tag number 9-Second Mortgage, and number 14-Life Time Value.

The customer file management infrastructure step of matching the current customer statistics by household and customer numbers is performed next (FIG. 22 block 366).

If the customer information indicates the customer does not have a second mortgage, and ranks in the top defined percentage of the Second Mortgage Model analysis (which analyzes number of credit card transactions, dollars spent on appliances, number of hardware transactions, months-on-books, number of children, number of cars, household income being greater than or equal to a defined limit, and total card spending being greater than or equal to a defined limit) (YES branch from block 368); then the customer record will have TAG 9-SECOND MORTGAGE (FIG. 3 block 116) appended to its information (block 370). If none of the TAG 9 criteria are met (NO branch from block 368) TAG 9 will not be appended to the customer record.

If the customer information indicates the customer ranks in the top defined percentage of the Life Time Value Model analysis (which analyzes a customers long-term revenue value to the institution) (YES branch from block 372); then the customer record will have TAG 14-LIFE TIME VALUE (FIG. 4 block 126) appended to its information (block 374). If none of the TAG 14 criteria are met (NO branch from block 372) TAG 14 will not be appended to the customer record.

Figure 23:
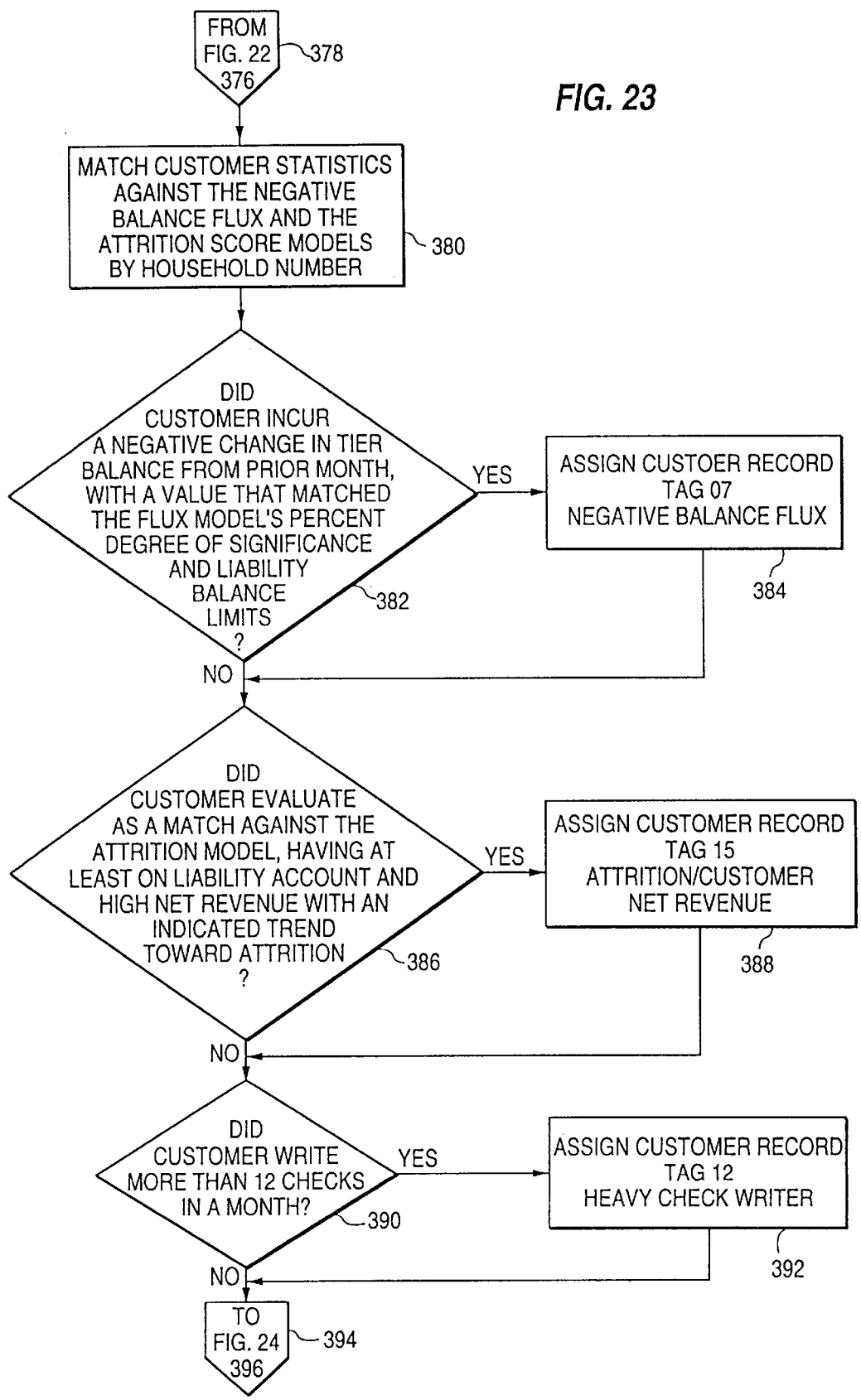
FIG. 23 diagrams more customer file management infrastructure and the tagging logic criteria for tag number 7-Negative Balance Flux, number 15-Attrition/Customer Net Revenue, and number 12-Heavy Check Writer.

The customer file management infrastructure step of matching the current customer statistics against the Negative Balance Flux and Attrition Score Models is performed next (FIG. 23 block 380).

If the customer information indicates the customer had a negative change in their tier balance from the prior month that matches the Flux Model's defined percent degree of significance and liability balance limits (YES branch from block 382); then the customer record will have TAG 7-NEGATIVE BALANCE FLUX (FIG. 3 block 112) appended to its information (block 384). If none of the TAG 7 criteria are met (NO branch from block 382) TAG 7 will not be appended to the customer record.

If the customer information indicates the customer is a match against the Attrition Model, has at least one liability account and has high net revenue with an indicated trend toward attrition (YES branch from block 386); then the customer record will have TAG 15-ATTRITION/CUSTOMER NET REVENUE (FIG. 5 block 128) appended to its information (block 388). If none of the TAG 15 criteria are met (NO branch from block 388) TAG 15 will not be appended to the customer record.

If the customer information indicates the customer has written more than twelve checks in a month (YES branch from block 390); then the customer record will have TAG 12-HEAVY CHECK WRITER (FIG. 4 block 122) appended to its information (block 392). If none of the TAG 12 criteria are met (NO branch from block 390) TAG 12 will not be appended to the customer record.

Figure 24:
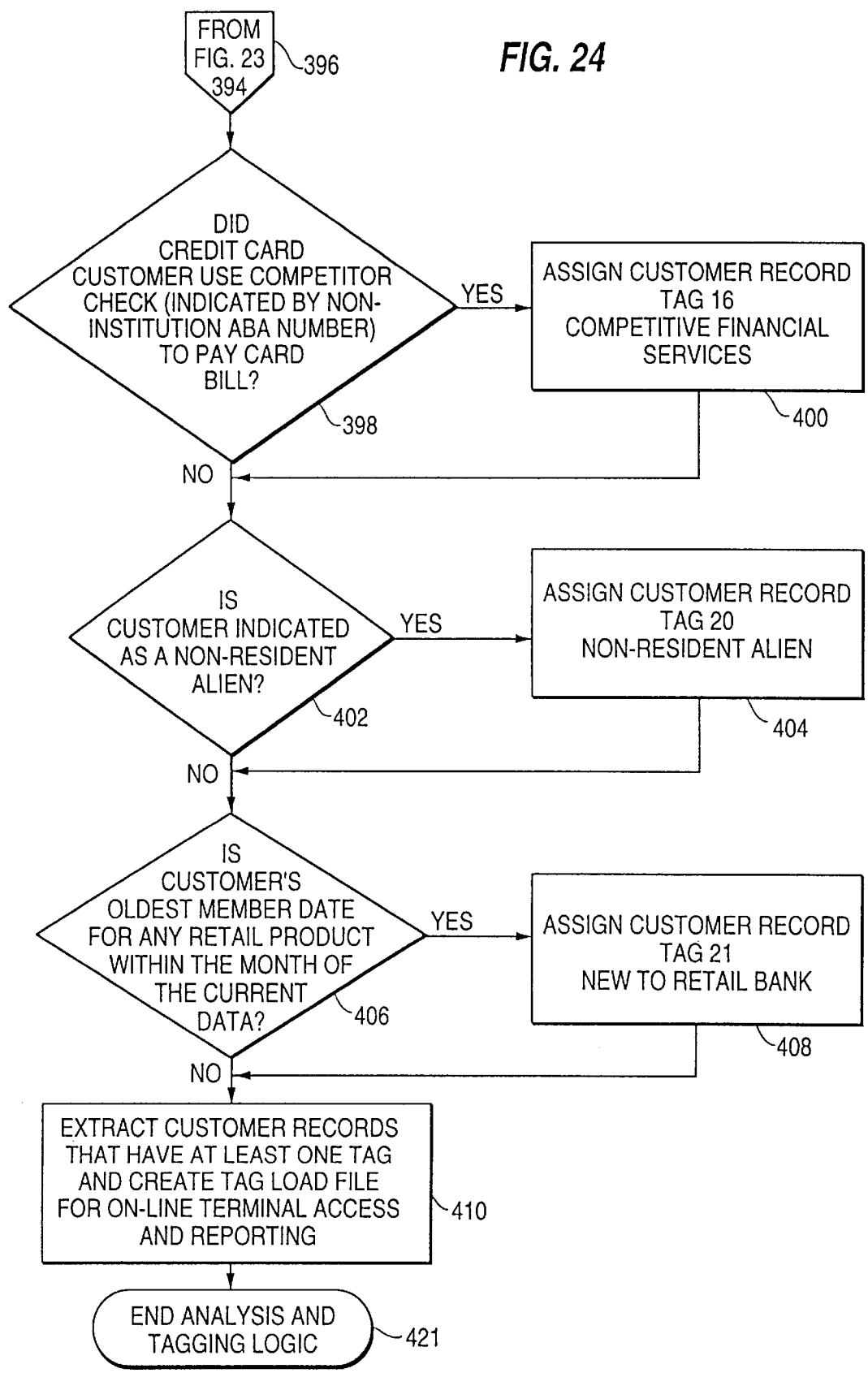
FIG. 24 diagrams the tagging logic criteria for tag number 16-Competitive Financial Services, number 20-Non-Resident Alien, and number 21-New To Retail Bank; also shown is the final customer file management infrastructure step for loading the tagged customer records to the on-line access, and the completion of the analysis and tagging logic process flow.

If the customer information indicates the customer is a credit card customer who used a competitor check (indicated by a non-institution ABA number) to pay their card bill (YES branch from FIG. 24 block 398); then the customer record will have TAG 16-COMPETITIVE FINANCIAL SERVICES (FIG. 5 block 130) appended to its information (block 400). If none of the TAG 16 criteria are met (NO branch from block 398) TAG 16 will not be appended to the customer record.

If the customer information indicates the customer is a non-resident alien (YES branch from block 402); then the customer record will have TAG 20-NON-RESIDENT ALIEN (FIG. 6 block 138) appended to its information (block 404). If none of the TAG 20 criteria are met (NO branch from block 402) TAG 20 will not be appended to the customer record.

If the customer information indicates the customer has an oldest member date on any retail product that is within the month of the current data (YES branch from block 406); then the customer record will have TAG 21-NEW TO RETAIL BANK (FIG. 6 block 140) appended to its information (block 408). If none of the TAG 21 criteria are met (NO branch from block 406) TAG 21 will not be appended to the customer record.

The customer file management infrastructure step of extracting the customer records with at least one attached tag and creating the load file for on-line terminal access and reporting will be performed to complete the analysis and tagging logic process flow (block 410).

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention. Accordingly, the invention is only limited by the following claims.

We claim:

1. A method for strategically identifying and communicating the availability of additional products to at least one customer of a financial institution comprising the steps of:

analyzing information about said customer from a database of a financial institution to identify at least one characteristic of said customer indicative of at least one financial product compatible with the financial needs of said customer;

marking a file in said electronic database associated with said customer with a mark identifying said at least one product;

accessing said file by a representative of said financial institution; and communicating the availability of said at least one financial product to said customer.

2. A system for strategically identifying and communicating the availability of additional products to at least one customer of a financial institution comprising:

a processor for analyzing information about said customer from a database of a financial institution to identify at least one characteristic of said customer indicative of at least one financial product compatible with the financial needs of said customer;

said processor marking a file in said electronic database associated with said customer with a mark identifying said at least one characteristic;

a representative of said financial representative accessing said file; and said representative communicating the availability of said at least one financial product to said customer.

3. The method of claim 1 wherein said financial products is selected from of the group consisting of: financial services, investment services, brokerage services, stock purchases, financial instrument purchases, mortgages, purchases of certificates of deposit (CD's), safety deposit box rentals, electronic home banking, loans, credit cards, premium credit cards, traveller checks, banking by personal computer, banking by telephone, banking by screen phone, and a second mortgage.

4. The method of claim 1 wherein said marking step further includes the step of marking said file with a plurality of marks each corresponding to a different financial product.

5. The method of claim 1 wherein said analyzing step further includes the step of reviewing past information about said customer and comparing said past information to current information about said customer.

6. The method of claim 1 wherein said representative is a bank teller.

7. The method of claim 1 wherein said representative is a telemartketing representative.

8. The method of claim 1 wherein said characteristic is selected from at least one of the group consisting of:

foreign purchases with a credit card, change in address, change in name, change in preferred branch of said financial institution, relatively high liability plus credit levels, teller activity levels, check writing activity levels, existence of a jumbo mortgage, credit limits on a credit card, purchases of computer-related goods, imminent loan maturity, imminent certificate of deposit maturity, savings trend, relatively high money market levels, credit card activity, purchases involving goods for the home of the customer, negative balance flux, use of checks from a different financial institution, the non-resident alien status of said customer and said customer having recently moved.

9. The method of claim 1 further comprising the step of generating periodic reports regarding the marking activity.

10. The system of claim 2 wherein said financial institution is a bank.

11. The system of claim 2 wherein said financial products is selected from of the group consisting of:

financial services, investment services, brokerage services, stock purchases, financial instrument purchases, mortgages, purchases of certificates of deposit (CD's), safety deposit box rentals, electronic home banking, loans, credit cards, premium credit cards, traveller checks, banking by personal computer, banking by telephone, banking by screen phone, and a second mortgage.

12. The system of claim 2 wherein said processor marks said file with a plurality of marks each corresponding to a different characteristic.

13. The system of claim 2 wherein said processor analyzes analyses past information about said customer and compares said past information to current information about said customer to determine said at least one characteristic.

14. The system of claim 2 wherein said representative accesses said file in an on-line environment.

15. The system of claim 2 wherein said representative is a bank teller.

16. The system of claim 2 wherein said representative is a telemarketing representative.

17. The system of claim 2 wherein said accessing is done in response to an interaction between said customer and said representative.

18. The system of claim 2 wherein said characteristic is selected from at least one of the group consisting of:

foreign purchases with a credit card, change in address, change in name, change in preferred branch of said financial institution, relatively high liability plus credit levels, teller activity levels, check writing activity levels, existence of a jumbo mortgage, credit limits on a credit card, purchases of computer-related goods, imminent loan maturity, imminent certificate of deposit maturity, savings trend, relatively high money market levels, credit card activity, purchases involving goods for the home of the customer, negative balance flux, use of checks from a different financial institution, the non-resident alien status of said customer and said customer having recently moved.

19. The system of claim 2 further comprising reporting means for periodically reporting on marking activity.

20. The method of claim 1, wherein said step of displaying comprises providing a screen display of each said tag entry in response to on-line customer account access by an authorized representative of the financial institution.

21. The method of claim 1 wherein said financial institution is a bank.

22. The method of claim 1 wherein said representative also performs said communicating step.

* * * * *